(12) United States Patent
Hoheisel (10) Patent No.: US 10,890,471 B2
(45) Date of Patent: Jan. 12, 2021

(54) METHOD AND ASSEMBLY FOR ULTRASONIC CLAMP-ON FLOW MEASUREMENT, AND BODIES FOR IMPLEMENTING OFF-CENTER FLOW MEASUREMENT

(71) Applicant: FLEXIM FLEXIBLE INDUSTRIEMESSTECHNIK GMBH, Berlin (DE)

(72) Inventor: Gerald Hoheisel, Berlin (DE)

(73) Assignee: FLEXIM FLEXIBLE INDUSTRIEMESSTECHNIK GMBH, Berlin (DE)

( * ) Notice: Subject to any disclaimer, the term of this patent is extended or adjusted under 35 U.S.C. 154(b) by 145 days.

(21) Appl. No.: 16/251,719

(22) Filed: Jan. 18, 2019

(65) Prior Publication Data

US 2019/0154483 A1     May 23, 2019

Related U.S. Application Data (63) Continuation of application No. PCT/EP2017/067421, filed on Jul. 11, 2017.

(30) Foreign Application Priority Data

Jul. 18, 2016 (EP) .................................. 16179958

(51) Int. Cl.
    *G01F 1/66*     (2006.01)
(52) U.S. Cl.
    CPC .............. *G01F 1/667* (2013.01); *G01F 1/662* (2013.01)
(58) Field of Classification Search
None
See application file for complete search history.

(56) References Cited

U.S. PATENT DOCUMENTS

| 4,400,803 A | 8/1983 | Spiess et al. |
| 5,650,572 A | 7/1997 | Vontz |
| 7,448,282 B2 | 11/2008 | Wiest et al. |
| (Continued) | | |

FOREIGN PATENT DOCUMENTS

| DE | 4336370 C1 | 2/1995 |
| DE | 19503714 A1 | 8/1996 |
| (Continued) | | |

OTHER PUBLICATIONS

International Search Report dated Oct. 5, 2017 in corresponding application PCT/EP2017/067421.

*Primary Examiner* — Harshad R Patel
*Assistant Examiner* — Nigel H Plumb
(74) *Attorney, Agent, or Firm* — Muncy, Geissler, Olds & Lowe, P.C.

(57) ABSTRACT

A method and an arrangement for ultrasonic clamp-on flow measurement with the aid of an off-center sound path measurement via clamp-on ultrasonic transducers being fastened to an intermediate piece of a process pipe. Center sound paths as well as off-center sound paths are taken into account for the flow measurement via the arrangement and method. The arrangement for measuring flow includes a process pipe, through which a liquid or gaseous process medium flows, and an acoustic transducer pair and second clamp-on ultrasonic transducer operating in receive mode is disposed on the process pipe where two bodies are disposed on the inner wall of the process pipe to aid the off-center measurement.

15 Claims, 6 Drawing Sheets

(56) References Cited

U.S. PATENT DOCUMENTS

| | | | |
|---|---|---|---|
| 7,810,399 | B2 | 10/2010 | Van Klooster et al. |
| 8,000,442 | B2 | 8/2011 | Lachaine et al. |
| 9,097,567 | B2 | 8/2015 | Wiest et al. |
| 9,689,727 | B2 | 6/2017 | Kissling et al. |
| 2011/0132102 | A1 | 6/2011 | Ueberschlag |
| 2016/0320219 | A1 | 11/2016 | Hellevang et al. |
| 2016/0327419 | A1 | 11/2016 | Hellevang et al. |

FOREIGN PATENT DOCUMENTS

| | | |
|---|---|---|
| DE | 19808642 C1 | 8/1999 |
| DE | 102007004936 A1 | 6/2008 |
| DE | 102011079250 A1 | 1/2013 |
| DE | 102013105922 A1 | 12/2014 |
| GB | 2521661 A | 7/2015 |
| WO | WO2006007716 A2 | 1/2006 |
| WO | WO2006048395 A1 | 5/2006 |

METHOD AND ASSEMBLY FOR ULTRASONIC CLAMP-ON FLOW MEASUREMENT, AND BODIES FOR IMPLEMENTING OFF-CENTER FLOW MEASUREMENT

This nonprovisional application is a continuation of International Application No. PCT/EP2017/067421, which was filed on Jul. 11, 2017, and which claims priority to European Patent Application No. 16179958.0, which was filed on Jul. 18, 2016, and which are both herein incorporated by reference.

BACKGROUND OF THE INVENTION

Field of the Invention

The present invention relates to a method and an arrangement for ultrasonic clamp-on flow measurement with the aid of a measurement of off-center sound paths, clamp-on ultrasonic transducers being fastened to an intermediate piece of a process pipe, hereinafter referred to as a spool piece. The invention also relates to bodies for implementing the measurement.

Description of the Background Art

Ultrasonic clamp-on flow meters are widely used in many areas of industry. One of their key advantages is that the flow measurement takes place contactlessly. In ultrasonic clamp-on flow meters, the difference in the propagation time of two acoustic signals propagating with or against the flow is measured according to the propagation time method, and the volume flow is calculated therefrom. For this purpose, two acoustic transducers are fastened to the pipe wall, both of which may be operated as transmitters and as receivers. An acoustic transducer is made up of an active element, such as a piezoceramic, which is disposed on a so-called acoustic transducer lead in such a way that the sound propagation takes place at an angle of incidence. The generation of excitation pulses for the acoustic transducer and the evaluation of the receive signals of the acoustic transducer take place in the measuring transducer. The latter provides one measuring channel for each acoustic transducer. The propagation time difference depends, among other things, on the average flow rate on the sound path as well as on the sound propagation time in the fluid.

To calculate the volume flow, a surface integral must be approximated from a path integral. This may result in errors in the calculation, particularly if the flow profile has inhomogeneities, which are triggered, for example, by elbows, diaphragms, flanges and/or by weld seams in the pipe. In addition, the flow profile is dependent on the viscosity and flow rate of the medium and may form in a laminar or turbulent manner, even though a turbulent one is normal.

The prior art discloses a number of approaches to circumventing these approximation errors.

Formulas exist, which take into account additional flow-mechanical characteristic variables in the approximation from the path integral to the surface integral. The disadvantage here is that these characteristic variables are not always available.

Moreover, distorted flow profiles may be counteracted by multi-channel measurement arrangements on difference measuring planes.

Long inlet and outlet sections may also be predefined, which prevent the faulty flow profile.

Ultrasonic inline devices, which are installed in the pipe for the measurements and which may thereby achieve a higher accuracy, are used, for example, as multibeam arrangements to measure additional path integrals, which do not run through the center of the round pipe (e.g. in Krohne DE 102007004936 A1, which corresponds to U.S. Pat. No. 7,810,399). These path integrals are hereinafter referred to as off-center sound paths. In an inline ultrasonic arrangement, the sound is directed directly into the measuring medium out of the acoustic transducers and back in again, and do not use an acoustic transducer lead or the normal pipe wall for inputting/outputting the acoustic signal.

When using clamp-on ultrasonic measuring sensors, off-center sound paths cannot be measured, due to Snell's law. Due to the high differences in the acoustic velocity between the pipe wall and process medium (approximately 3000 m/s for steel, 1000 to 2000 for shear waves and liquids; <1000 for gases), the possible exit angles from the measuring medium into the pipe are limited. Only small angles outside the direct, normal (perpendicular) exit are possible. In a round pipe, therefore, only path integrals which run through the center of the pipe are measurable. However, inhomogeneities in the flow profile occur, particularly at the edges.

One approach is proposed in patent specification DE 19808642 C1. Clamp-on ultrasonic measuring sensors are used on a pentagonal or rectangular pipe piece (spool piece) instead of on a round pipe piece. Due to this special arrangement, the sound paths also run outside the center of the pipe and thus also pass through edge areas of the flow profile. This makes it possible to measure off-center path integrals.

Using a specially shaped, non-round pipe piece, and using reflectors in the interior of the pipe piece, path integrals are also possible which do not run only through the center of the pipe piece (DE 4336370 C1, which corresponds to U.S. Pat. No. 5,650,572). The reflectors have a complex design (DE 102013105922 A1, which corresponds to U.S. Pat. No. 9,689,727), or the pipe inner wall may be prepared with reflector surfaces in precisely calculated locations (DE 102011079250 A1, which corresponds to U.S. Pat. No. 9,097,567).

GB 2521661 A describes a flow meter having different sensor arrangements. Acoustic radiation is transmitted and received. The sensors are arranged around a pipe from the outside. Measuring paths along the pipe center (on-axis) and outside the pipe center (off-axis) are evaluated to distinguish between laminar, turbulent and transitional states. The superordinate objective of the invention is a flow meter which is also able to measure mixed phases, multiphases of gas and liquid, upstream and downstream.

A flow meter is described in US 2011/0132102 A1, which is made up of at least one ultrasonic transducer and an evaluation unit. The ultrasonic transducer or the measuring pipe is structurally prepared in such a way that the perpendicularly irradiated sound wave is refracted when passing over a boundary layer from a matching layer/pipe wall/measuring medium. This is implemented by a coupling layer. The coupling layer is a recess in the pipe inner wall, which, in turn, has the shape in cross section of multiple consecutive triangles. Sound paths result thereby, which propagate in and against the flow direction, so that a propagation time difference measurement is possible with the aid of only one acoustic transducer and the coupling layer.

The publication DE 19503714 A1 describes an ultrasonic flow meter. It describes how to minimize the influence of cross flows due to an optimized arrangement of sensor pairs.

Different arranged radiation planes having a total of three sensor pairs are used. None of these radiation planes includes off-center sound paths. All planes pass through the center of the pipe.

A measuring unit is disclosed in WO 2006/007716 A2, which calibrates medical diagnostic instruments. The diagnostic instruments use an imaging method with the aid of ultrasound. Cylindrical elements are illustrated here, which simulate bones or the like in the imaging calibration unit.

U.S. Pat. No. 4,400,803 A describes an echo sounding/sonar method, in which a desired opening angle of the sound radiation may be set with the aid of a special transceiver structure to explore the topology of the ocean floor. The dispersion of the sound waves is bundled by curved reflectors, similar to a lamp reflector.

SUMMARY OF THE INVENTION

It is therefore an object of the present invention to provide an arrangement and a method for measuring flow, which overcomes the disadvantages of the prior art and also has a high measurement accuracy over a large measurement range, even under difficult measuring conditions, and which carries out a flow profile correction by additionally measuring off-center sound paths. The object of the invention is also to provide a body for implementing the measurement of off-center sound paths.

The object is achieved by a method for ultrasound clamp-on flow measurement with a process pipe, through which a liquid or gaseous process medium flows, and comprising clamp-on ultrasonic transducers. Both center sound paths and off-center sound paths are taken into account by the method. The method can include the following steps: Injecting ultrasonic waves into the process pipe and into the process medium via at least one clamp-on ultrasonic transducer operating in transmit mode; On the opposite side of the clamp-on ultrasonic transducer operating in transmit mode, sound waves which cross the center of the process pipe strike at least one first body, which is disposed in the interior of the process pipe and implements a measurement of off-center sound paths, which do not run through the center of the process pipe and are dispersed there into the entire interior of the process pipe; Due to at least one second body, which is disposed on the inner wall of the process pipe and is used to implement the measurement of off-center sound paths, a total reflection of the dispersed ultrasonic waves is prevented when the dispersed ultrasonic waves cross the boundary from the process medium to the process pipe, so that the dispersed ultrasonic waves are able to leave the process pipe; Finally, undisturbed ultrasonic waves of the center sound paths passing through the center of the pipe are received by at least one first clamp-on ultrasonic transducer operating in receive mode. The dispersed ultrasonic waves of the off-center sound paths are received by at least one second clamp-on ultrasonic transducer operating in receive mode.

To adapt the ultrasonic clamp-on flow measurement to different process media with their different acoustic velocities, the clamp-on ultrasonic sensors may be displaced on the outside of the pipe in the longitudinal axis of the process pipe. Due to an elongated, cylindrical or partially cylindrical shape of the bodies for implementing the measurement of off-center sound paths, an assignment of the clamp-on ultrasonic sensors to the bodies is obtained, since the latter are arranged in the longitudinal direction of the pipe inner wall.

The object is also achieved by an arrangement for ultrasonic clamp-on flow measurement, comprising a process pipe, through which a liquid or gaseous process medium flows, and comprising clamp-on ultrasonic transducers having at least one acoustic transducer pair, made up of a clamp-on ultrasonic transducer operating in transmit mode and a first clamp-on ultrasonic transducer operating in receive mode. The acoustic transducer pair is used to measure undisturbed sound paths passing through the center of the pipe, so-called center sound paths. The clamp-on ultrasonic transducers are fastened to the process pipe.

At least one additional clamp-on ultrasonic transducer operating in receive mode is disposed on the process pipe. It receives sound paths which do not run through the center of the process pipe, so-called off-center sound paths. According to the invention, at least two bodies for implementing the measurement of off-center sound paths are disposed on the inner wall of the process pipe, at least one body for implementing the measurement of off-center sound paths in the process pipe being disposed diagonally opposite a clamp-on ultrasonic transducer operating in transmit mode for the purpose of dispersing incoming sound paths throughout the entire interior of the process pipe. The second body for implementing the measurement of off-center sound paths is disposed in the process pipe upstream from the second clamp-on ultrasonic transducer operating in receive mode to absorb part of the dispersed sound waves and guide them via the pipe wall of the process pipe to the second clamp-on ultrasonic transducer operating in receive mode.

The clamp-on ultrasonic transducers used are advantageously clamp-on ultrasonic transducers operating in receive mode as well as clamp-on ultrasonic transducers operating in transmit mode.

The object is furthermore achieved by bodies for implementing a measurement of off-center sound paths during an ultrasonic clamp-on flow measurement. The body according to the invention is disposed along a longitudinal axis of a process pipe. The elongated body preferably has a cylindrical or partially cylindrical or tubular design, its diameter being smaller than the diameter of the process pipe. The body according to the invention has a fully tubular or semi-tubular design in the exemplary embodiments.

In an exemplary embodiment, the body is formed from solid material or may be filled with a liquid or gaseous medium.

The body is fastened to the inner wall of the process pipe by a non-detachable connection, for example a welded, glued and/or riveted connection.

The bodies for implementing the measurement of off-center sound paths may be integrated into a simple spool piece, whose basic element is a straight, standard pipe fitting assembly. A universal ultrasonic clamp-on process may be combined with the spool piece thereby.

The shape and orientation of the bodies according to the invention along the pipe permit a universal use for all round, standard process pipes. The entire arrangement may be adapted to all process media having different acoustic velocities by axially displacing the clamp-on ultrasonic transducers along the process pipe in the axial direction on the outer wall of the pipe. Due to the elongated shape of the bodies for implementing the measurement of off-center sound paths, the effect of the bodies is not lost during the axial displacement of the clamp-on ultrasonic transducers along the process pipe.

The bodies of the arrangement according to the invention make it possible to input and output off-center sound paths in a process medium. These off-center sound paths permit an additional sensing of the flow profile in addition to the conventional sensing of the sound paths passing through the center of the process pipe. As a result, a precise measurement of a volume flow of the process medium is possible using a propagation time difference method.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

The arrangement according to the invention for ultrasonic clamp-on flow measurement comprises a process pipe 1, filled with a process medium 2, at least three clamp-on ultrasonic transducers U, which are designed as transmitters and/or receivers, and at least two bodies K for implementing a measurement of off-center sound paths 32. Clamp-on ultrasonic transducers U are situated outside a process pipe 1, on the outer pipe wall thereof. Bodies K for implementing the measurement of off-center sound paths 32 are disposed in the inside of process pipe 1, on the inner wall thereof. The arrangement is preferably designed in the form of a spool piece, process pipe 1 generally having a round cross section.

Figure 1:
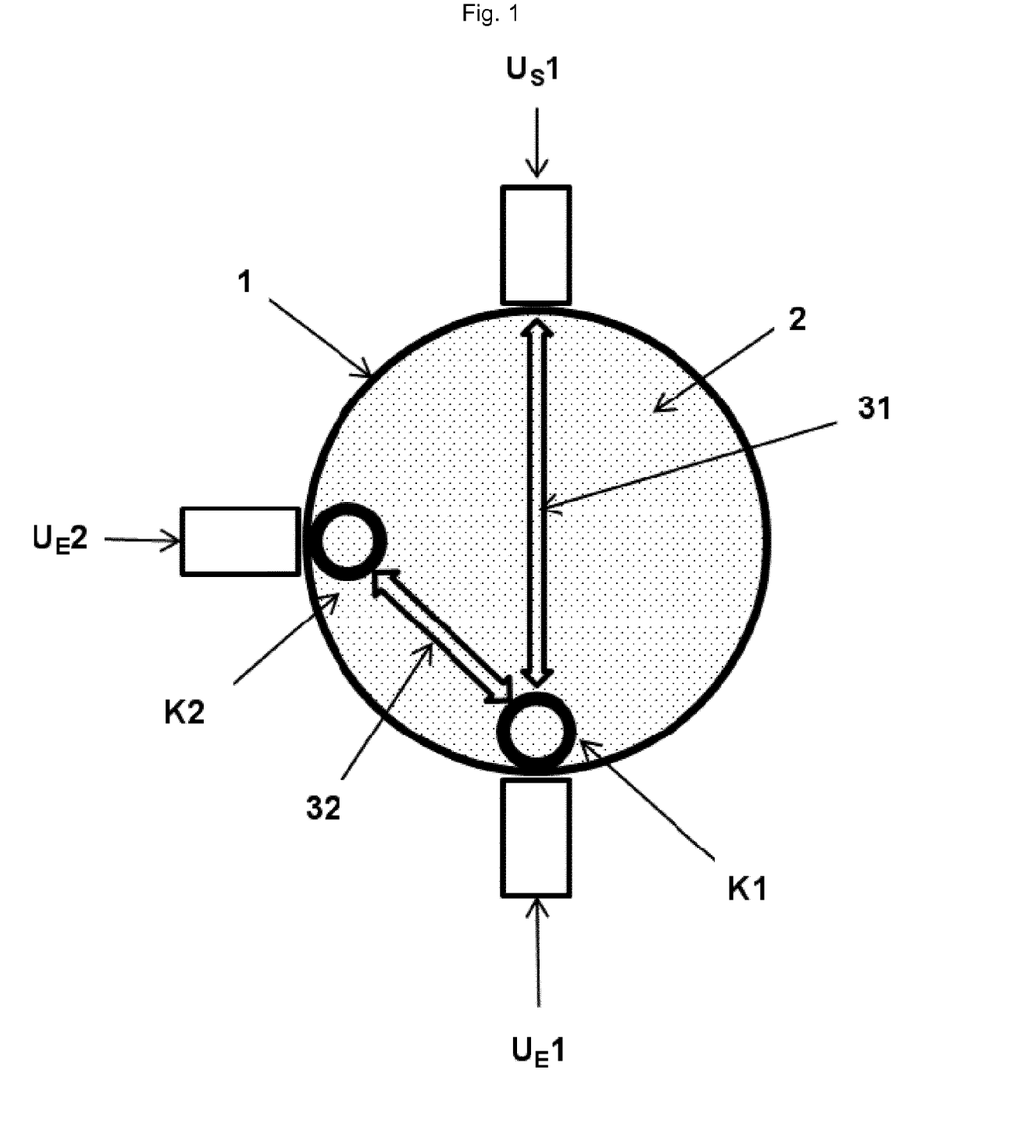
FIG. 1 shows a diagram of an arrangement for ultrasonic clamp-on flow measurement, including three clamp-on ultrasonic transducers and two bodies for implementing a measurement of off-center sound paths in a sectional representation of the process pipe.

FIG. 1 shows a diagram of the arrangement according to the invention for ultrasonic clamp-on flow measurement, which comprises three clamp-on ultrasonic transducers U, at least one clamp-on ultrasonic transducer being a clamp-on ultrasonic transducer operating in transmit mode $U_S 1$, and two others being clamp-on ultrasonic transducers operating in receive mode $U_E 1$, $U_E 2$. Two bodies K designed as elongated pipes for implementing the measurement of off-center sound paths 32 are disposed axially on the pipe inner wall at different angles, for example 180° and 270°. Clamp-on ultrasonic transducers U are disposed on the outer wall of process pipe 1 in such a way that clamp-on ultrasonic transducer operating in transmit mode $U_S 1$ is disposed opposite first clamp-on ultrasonic transducer operating in receive mode $U_E 1$, so that a single-path arrangement is implemented between clamp-on ultrasonic transducers $U_S 1$ and $U_E 1$. As in an arrangement without bodies K for implementing the measurement of off-center sound paths 32, sound waves are transmitted and received through the center point of process pipe 1, so-called center sound paths 31. On process pipe 1, a first body K1 for implementing the measurement of off-center sound paths 32, with the aid of which the incoming sound waves of center sound paths 31 are dispersed and radiated into the entire solid angle of the pipe interior, is situated on clamp-on ultrasonic transducer $U_E 1$, running on the inner wall of process pipe 1 in parallel to the pipe wall. Part of the dispersed sound waves, so-called off-center sound paths 32, reach second body K2. A second clamp-on ultrasonic transducer operating in receive mode $U_E 2$ is assigned to second body K2 for implementing the measurement of off-center sound paths 32 on the outer wall of process pipe 1. Second body K2 absorbs off-center sound waves 32. A total reflection of the ultrasonic waves when the ultrasonic waves cross the boundary from process medium 2 to process pipe 1 is prevented thereby, so that the dispersed sound waves are able to leave process pipe 1 to be able to be detected by second clamp-on ultrasonic transducer $U_E 2$.

Figure 2A:
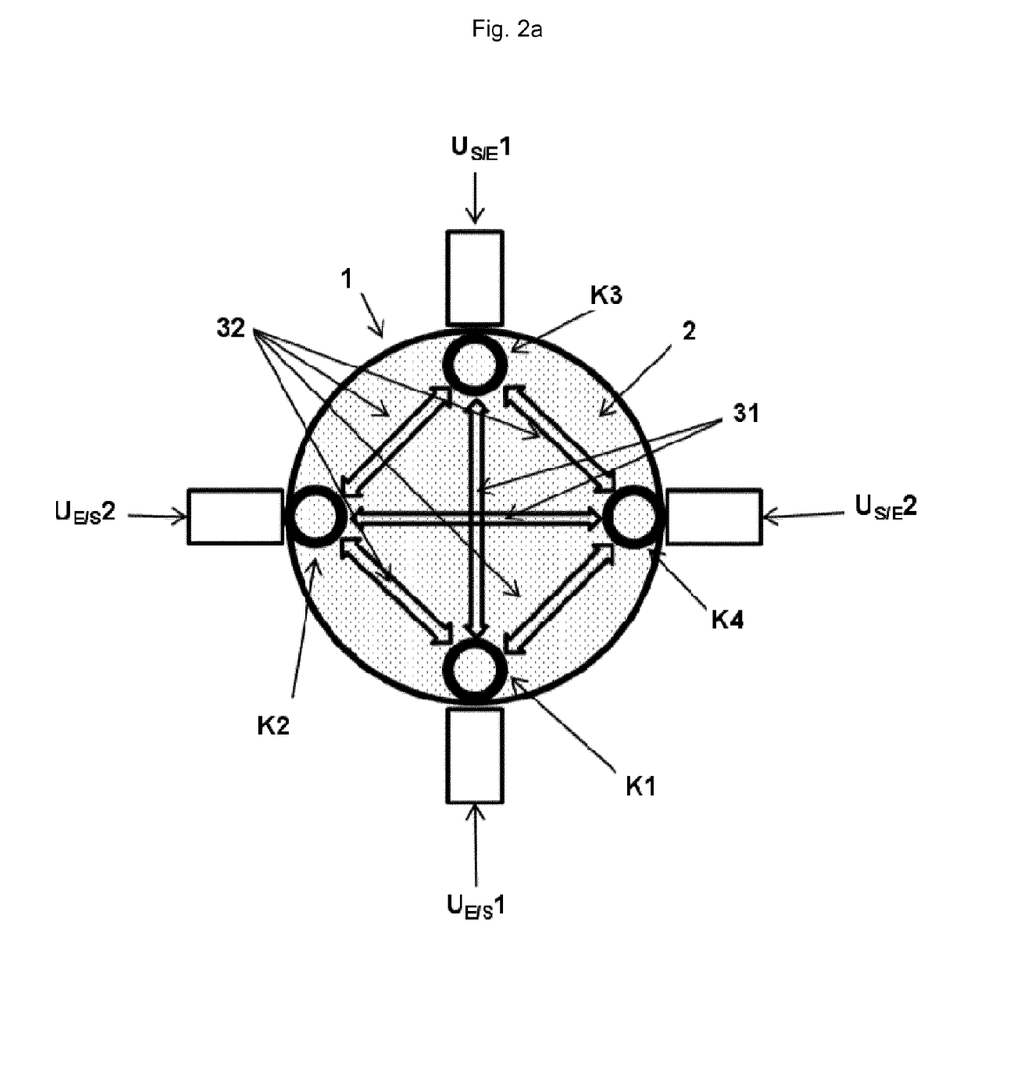
FIG. 2a shows a diagram of an arrangement for ultrasonic clamp-on flow measurement, including four clamp-on ultrasonic transducers and four bodies for implementing the measurement of off-center sound paths, in a sectional representation of the process pipe.
Figure 2B:
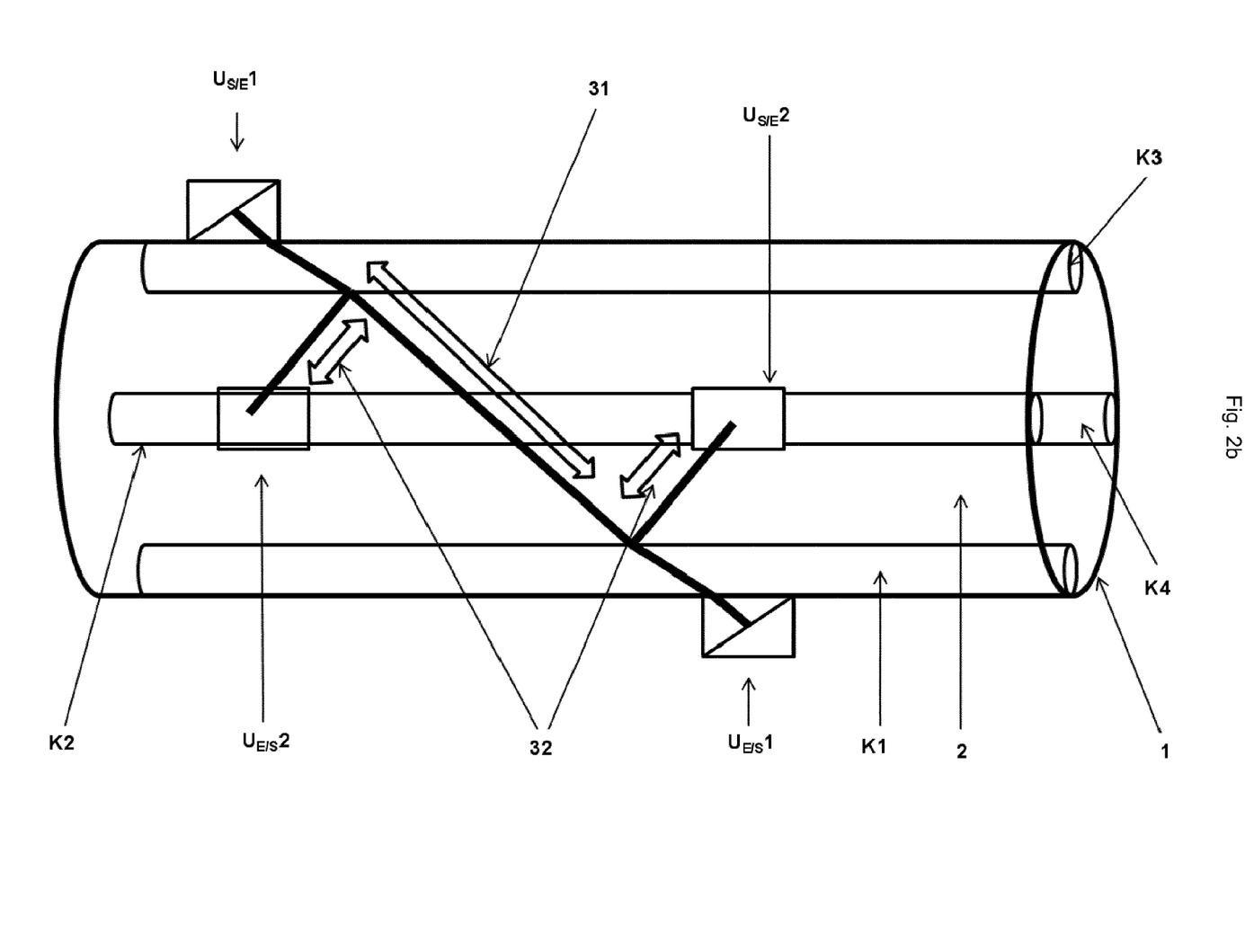
FIG. 2b shows a diagram of an arrangement for ultrasonic clamp-on flow measurement, including four clamp-on ultrasonic transducers and four bodies for implementing the measurement of off-center sound paths, in a perspective representation along the process pipe.

FIGS. 2a and 2b show the off-center spool piece according to the invention, including four clamp-on ultrasonic transducers U and four tubular bodies K for implementing the measurement of off-center sound paths 32. FIG. 2a shows the sectional representation of process pipe 1. Clamp-on ultrasonic transducers U, which in this specific embodiment may simultaneously be clamp-on ultrasonic transducers operating in receive mode $U_{E/S}$ and clamp-on ultrasonic transducers operating in transmit mode $U_{S/E}$, are disposed opposite each other on the outer wall of process pipe 1, the following pairs being opposite each other: clamp-on ultrasonic transducer $U_{S/E} 1$ and clamp-on ultrasonic transducer $U_{E/S} 1$, clamp-on ultrasonic transducer $U_{S/E} 2$ and clamp-on ultrasonic transducer $U_{E/S} 2$. Four bodies K are axially disposed within process pipe 1, the latter being disposed on the inner wall of process pipe 1, running parallel to the pipe wall, for example at angles 0°, 90°, 180° and 270°. One clamp-on ultrasonic transducer U is assigned to each body K for implementing the measurement of off-center sound paths 32, body K1 being situated on clamp-on ultrasonic transducer $U_{E/S} 1$, body K2 being situated on clamp-on ultrasonic transducer $U_{E/S} 2$, body K3 being situated on clamp-on ultrasonic transducer $U_{S/E} 1$ and body K4 being situated on clamp-on ultrasonic transducer $U_{S/E} 2$. Due to this arrangement, off-center sound paths 32 are also measured in addition to center sound paths 31 which form oppositely situated clamp-on ultrasonic transducer pairs $U_{S/E} 1/U_{E/S} 1$ and $U_{S/E} 2/U_{E/S} 2$. In the perspective representation in FIG. 2b, corresponding center sound paths 31 and off-center sound paths 32 are schematically sketched between clamp-on ultrasonic transducers U along the longitudinal axis of a process pipe 1.

Figure 2C:
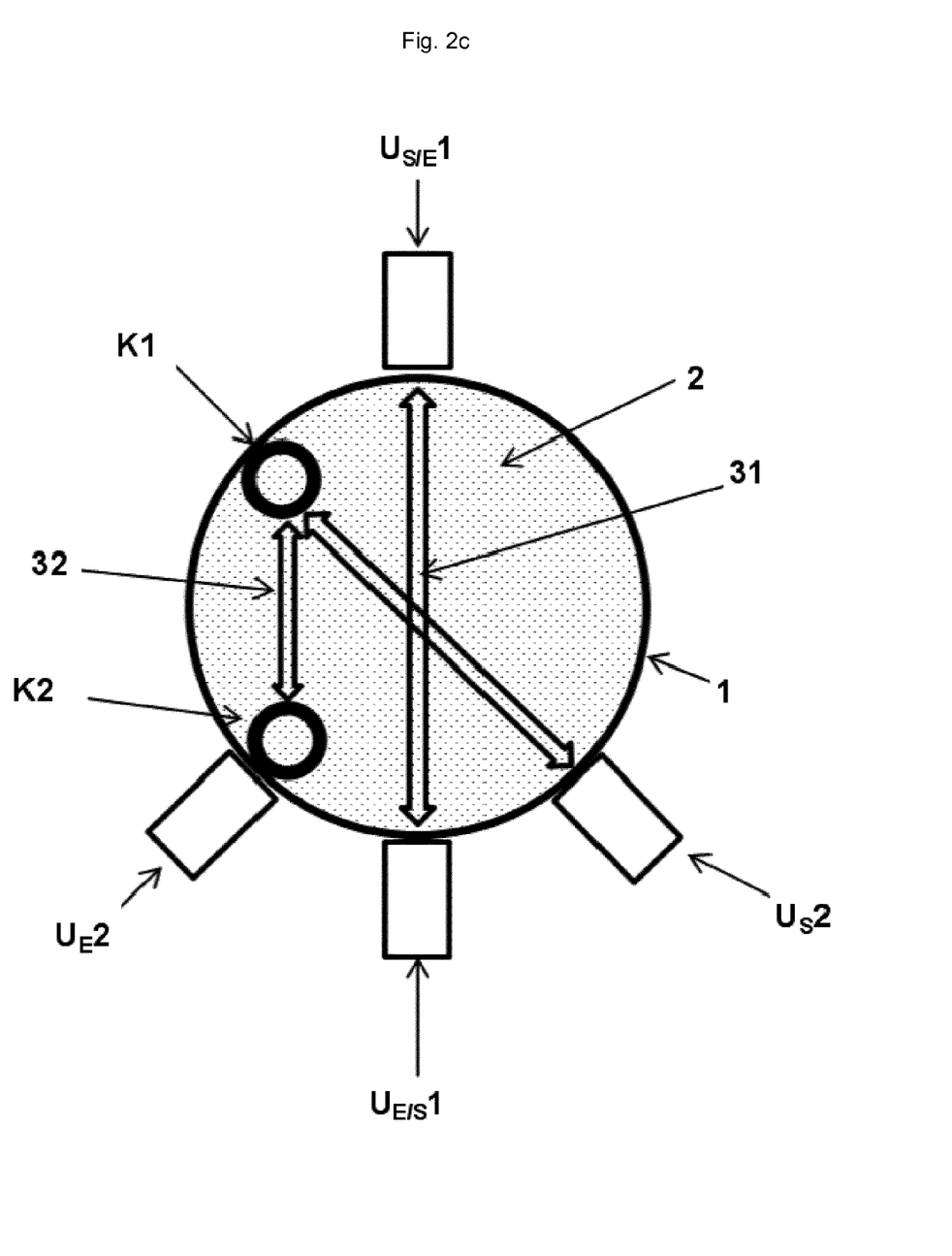
FIG. 2c shows a diagram of an arrangement for ultrasonic clamp-on flow measurement, including four clamp-on ultrasonic transducers and two bodies for implementing the measurement of off-center sound paths, in a sectional representation of the process pipe.

FIG. 2c shows a simple and robust arrangement. Clamp-on ultrasonic transducer pair $U_{S/E}1/U_{E/S}1$ exclusively measures center sound paths 31. No bodies K for implementing the measurement of off-center sound paths 32 are arranged along these center sound paths 3. In this arrangement, clamp-on ultrasonic transducer pair $U_E2/U_S2$ is used to measure off-center sound paths 32. Off-center sound paths 32 are generated by body K2, which disperses the acoustic signals of clamp-on ultrasonic transducer $U_S2$ within pipe interior 2, and are absorbed by body K2, whereby clamp-on ultrasonic transducer $U_E2$, which is assigned to body K2 for measuring off-center sound paths 32, is able to detect off-center sound paths 32.

Figure 2D:
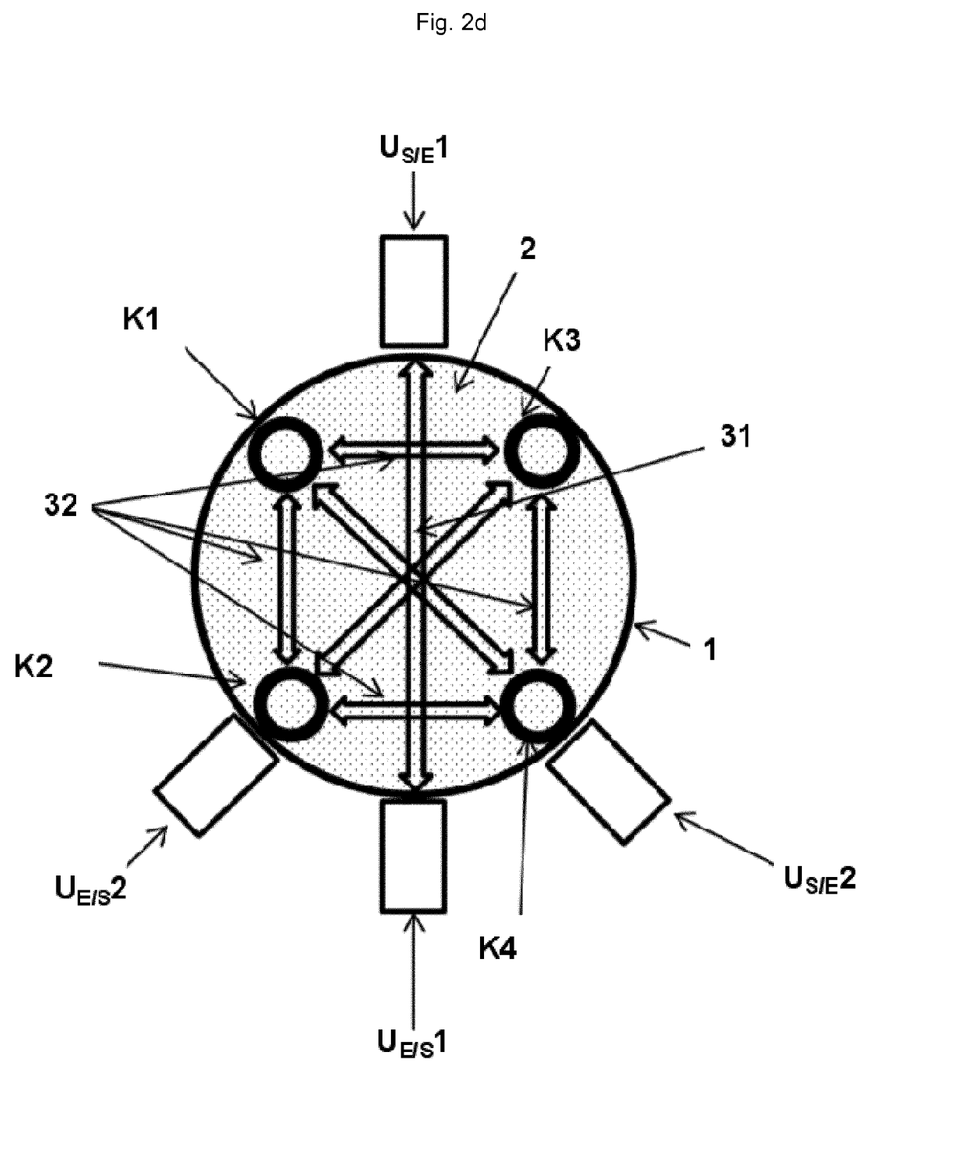
FIG. 2d shows a diagram of an arrangement for ultrasonic clamp-on flow measurement, including four clamp-on ultrasonic transducers and four bodies for implementing the measurement of off-center sound paths with an undisturbed center sound path, in a sectional representation of the process pipe.

FIG. 2d shows another arrangement, similar to FIG. 2c. Two additional bodies K are also disposed here. The concept that center sound paths 31 of clamp-on ultrasonic transducer pair $U_{S/E}2/U_{E/S}2$ are not disturbed by bodies K for implementing the measurement of off-center sound paths 32 is retained. Additional bodies K3 and K4 permit the measurement of multiple off-center sound paths 32 with the aid of clamp-on ultrasonic transducers $U_{S/E}2/U_{E/S}2$.

Figure 3:
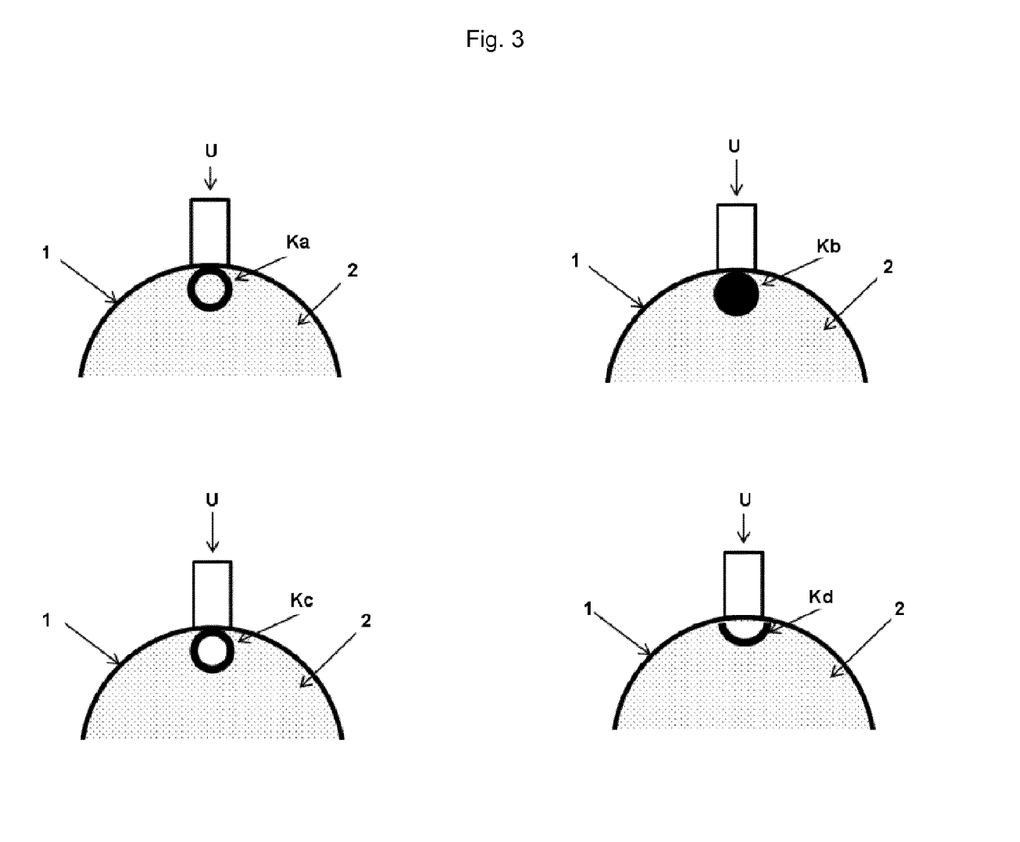
FIG. 3 shows bodies for implementing the measurement of off-center sound paths in different designs.

Different specific embodiments of bodies K for implementing the measurement of off-center sound paths 32 are illustrated in FIG. 3, body Ka being designed as a pipe filled with process medium 2, body Kb being designed as a rod made from solid material, e.g. steel, body Kc being designed as a pipe filled with air, and body Kd being designed as a half pipe filled with air. Other half-pipe designs filled with process medium 2 or made from solid material are conceivable.

Since the preceding arrangement described in detail and the method described in detail are exemplary embodiments, they may be modified by those skilled in the art in the usual manner to a large extent without departing from the scope of the invention. In particular, the specific embodiments of the arrangement may also take a different form than the one described herein. Likewise, the arrangement may be designed in a different shape if necessary for reasons of space or for design reasons.

What is claimed is:

1. A method for ultrasonic clamp-on transceiving, comprising a process pipe through which a liquid or gaseous process medium flows and clamp-on ultrasonic transducers, the method comprising:
   injecting ultrasonic waves into the process pipe and into the process medium via at least one initial clamp-on ultrasonic transducer operating in a transmit mode;
   dispersing the ultrasonic waves off-center of an axis of the process pipe within the process pipe via at least one first body, which is disposed on an inner wall of the process pipe and enables measurement of off-center sound paths created by generating the dispersion;
   preventing a total reflection of the dispersed ultrasonic waves when the dispersed ultrasonic waves cross a boundary from the process medium to the process pipe via at least one second body, which is disposed on the inner wall of the process pipe and enables the measurement of off-center sound paths so that the dispersed ultrasonic waves may leave the process pipe via the at least one second body;
   receiving undisturbed ultrasonic waves of the center sound paths via at least one first clamp-on ultrasonic transducer operating in a receive mode; and
   receiving dispersed ultrasonic waves of the off-center sound paths via at least one second clamp-on ultrasonic transducer operating in the receive mode.

2. The method according to claim 1, wherein the clamp-on ultrasonic transducers are displaced axially along the process pipe, the bodies for implementing the measurement of off-center sound paths having an elongated shape.

3. The method according to claim 1, wherein the at least one first body or the at least one second body has an elongated cylindrical and/or a tubular design and a diameter that is smaller than a diameter of the process pipe.

4. The method according to claim 1, wherein the at least one first body or the at least one second body has a fully tubular or semi-tubular design.

5. The method according to claim 1, wherein the at least one first body or the at least one second body is cylindrical or semi-cylindrical and formed from a solid material.

6. The method according to claim 1, wherein the at least one first body or the at least one second body is filled with a liquid or gaseous process medium.

7. The method according to claim 1, wherein the at least one second ultrasonic receiver is directly adjacent a first section of the inner wall, the at least one second body being disposed on the first section of the inner wall such that the at least one second body deflects the ultrasonic waves, dispersed off-center by the at least one first body, towards the at least one second clamp-on ultrasonic transducer operating in the receive mode.

8. The method according to claim 1, wherein a first radial line across the process pipe intersects the at least one initial clamp-on ultrasonic transducer, the at least one first body, and the at least one first clamp-on ultrasonic transducer operating in the receive mode, and
   wherein a second radial line, offset circumferentially along the process pipe from the first radial line, intersects the axis of the process pipe, the at least one second body, and the at least one second clamp-on ultrasonic transducer operating in the receive mode.

9. The method according to claim 8, wherein the second radial line is offset circumferentially along the process pipe by 90 degrees from the first radial line.

10. An arrangement for ultrasonic clamp-on flow measurement, comprising:
    a process pipe through which a liquid or gaseous process medium flows;
    at least one acoustic transducer pair, having a clamp-on ultrasonic transducer operating in transmit mode and a clamp-on ultrasonic transducer operating in receive mode for measuring center sound paths;
    at least one additional clamp-on ultrasonic transducer operating in receive mode being disposed on the process pipe for measuring off-center sound paths; and
    at least two bodies generating off-center sound paths for measurement, the at least two bodies being disposed on an inner wall of the process pipe along a longitudinal axis, a first body of the at least two bodies dispersing off-center ultrasonic beams towards a second body of the at least two bodies,
    wherein the first body is disposed on the inner wall opposite the clamp-on ultrasonic transducer of the at least one acoustic transducer pair operating in transmit mode.

11. The arrangement according to claim 10, wherein the first body of the at least two bodies is disposed in the process pipe diagonally opposite the clamp-on ultrasonic transducer operating in transmit mode, and at least one second body of the at least two bodies is disposed in the process pipe upstream from the additional clamp-on ultrasonic transducer operating in receive mode.

12. The arrangement according to claim 10, wherein the clamp-on ultrasonic transducers are ultrasonic transducers operating in receive mode and ultrasonic transducers operating in transmit mode.

13. The arrangement according to claim 10, wherein a first portion of a center ultrasonic beam is received at the clamp-on ultrasonic transducer operating in receive mode of the at least one acoustic transducer pair, and wherein a second portion of the center ultrasonic beam is dispersed as the off-center ultrasonic beams towards the at least one additional clamp-on ultrasonic transducer operating in the receive mode.

14. The arrangement according to claim 10, wherein a first radial line across the process pipe intersects the first body, the clamp-on ultrasonic transducer operating in transmit mode, and the clamp-on ultrasonic transducer operating in receive mode, and
  wherein a second radial line, offset circumferentially along the process pipe from the first radial line, intersects the axis of the process pipe, the at least one second body, and the at least one additional clamp-on ultrasonic transducer operating in receive mode.

15. The arrangement according to claim 14, wherein the second radial line is offset circumferentially along the process pipe by 90 degrees from the first radial line.

\* \* \* \* \*